United States Patent
Sethuraman et al.

(10) Patent No.: US 12,041,170 B2
(45) Date of Patent: Jul. 16, 2024

(54) CLOUD TO CLOUD TEST SET UP FOR AUTHENTICATION AND MONITORING

(71) Applicant: Salesforce, Inc., San Francisco, CA (US)

(72) Inventors: Priya Sethuraman, Fremont, CA (US); Nishkam Agrawal, San Jose, CA (US); Jayanth Parayil Kumarji, Redwood City, CA (US); Percy Mehta, Foster City, CA (US)

(73) Assignee: Salesforce, Inc., San Francisco, CA (US)

( * ) Notice: Subject to any disclaimer, the term of this patent is extended or adjusted under 35 U.S.C. 154(b) by 173 days.

(21) Appl. No.: 17/525,812

(22) Filed: Nov. 12, 2021

(65) Prior Publication Data

US 2023/0155830 A1 May 18, 2023

(51) Int. Cl.
*H04L 9/32* (2006.01)
*G06F 11/34* (2006.01)
*H04L 9/08* (2006.01)
*H04L 43/50* (2022.01)

(52) U.S. Cl.
CPC ........ *H04L 9/3213* (2013.01); *G06F 11/3457* (2013.01); *H04L 9/0825* (2013.01); *H04L 43/50* (2013.01)

(58) Field of Classification Search
CPC ..... H04L 9/3213; H04L 9/0825; H04L 43/50; H04L 63/0807; H04L 63/101; H04L 63/126; H04L 43/55; G06F 11/3457
See application file for complete search history.

(56) References Cited

U.S. PATENT DOCUMENTS

| | | | |
|---|---|---|---|
| 7,730,478 B2 | 6/2010 | Weissman | |
| 8,688,736 B2 | 4/2014 | Mehta et al. | |
| 9,154,611 B1* | 10/2015 | Jackson | H04L 43/50 |
| 9,495,430 B2 | 11/2016 | Rajendran et al. | |
| 10,108,733 B2 | 10/2018 | Jacob et al. | |
| 10,579,800 B2* | 3/2020 | Blundell | G06F 21/57 |
| 10,762,109 B2 | 9/2020 | Rushan et al. | |
| 11,050,700 B2 | 6/2021 | Roller et al. | |
| 11,138,204 B2 | 10/2021 | Mehta et al. | |
| 11,314,767 B2 | 4/2022 | Ke et al. | |
| 11,630,844 B2 | 4/2023 | Patel et al. | |
| 2016/0085861 A1* | 3/2016 | Vecera | G06F 3/0629 713/168 |
| 2019/0102162 A1* | 4/2019 | Pitre | H04L 63/104 |
| 2019/0312859 A1* | 10/2019 | Yang | H04L 63/20 |
| 2021/0136026 A1 | 5/2021 | Parayil Kumarji et al. | |
| 2021/0149720 A1 | 5/2021 | Mehta et al. | |

(Continued)

*Primary Examiner* — J. Brant Murphy
(74) *Attorney, Agent, or Firm* — Nicholson De Vos Webster & Elliott LLP

(57) ABSTRACT

A method and system uses a test cloud system for monitoring cloud to cloud performance. The method includes initiating a first trust relationship by the test cloud system with a first target cloud system, receiving a success indicator for the trust relationship, in response to the first target cloud verifying the test cloud system is whitelisted, generating a security token using a private key of the test cloud system, and invoking a function of an application programming interface of the first target cloud using the security token to validate functionality of the function of the application programming interface of the first target cloud.

21 Claims, 7 Drawing Sheets

(56) References Cited

U.S. PATENT DOCUMENTS

| | | |
|---|---|---|
| 2021/0232603 A1 | 7/2021 | Sundaram et al. |
| 2021/0232604 A1 | 7/2021 | Sundaram et al. |
| 2021/0240551 A1* | 8/2021 | Joyce .................. H04L 67/02 |
| 2021/0240678 A1 | 8/2021 | Patel et al. |
| 2021/0240679 A1 | 8/2021 | Patel et al. |
| 2021/0240714 A1 | 8/2021 | Ho et al. |
| 2021/0243246 A1 | 8/2021 | Patel et al. |
| 2022/0345458 A1 | 10/2022 | Kumarji et al. |
| 2023/0061291 A1* | 3/2023 | Nealis .................. G06F 8/63 |

\* cited by examiner

CLOUD TO CLOUD TEST SET UP FOR AUTHENTICATION AND MONITORING

TECHNICAL FIELD

One or more implementations relate to the field of cloud to cloud authentication and monitoring; and more specifically, to a system and process to monitor the operation of a target cloud system including securely validating and monitoring application programming interface functions.

BACKGROUND ART

Public-key cryptography (a type of asymmetric cryptography) uses pairs of cryptographic keys for encrypting communication channels. Each endpoint of the communication channel has a separate pair of cryptographic keys. The pairs of cryptographic keys include a public key and a private key. A public key is known or shared and thus publicly available. The private key is kept as a secret and not shared. The key pairs can be generated using special cryptographic algorithms that are one-way functions (i.e., not reversible). A key pair is generally generated from a large random number. When establishing an encrypted communication channel, a sender can encrypt a message using the recipient's public key. The message encrypted using the public key can only be decrypted using the recipient's private key. Asymmetric cryptography can be combined with symmetric cryptography, which is more efficient to process by using asymmetric cryptography to securely exchange symmetric keys.

In modern computing architectures, a tenant may have applications that are executing in separate cloud systems that need to communicate with one another or one tenant application on one cloud computing system may seek to communicate with an application of another tenant on another cloud computing system. Communication between cloud systems can be referred to as cloud to cloud (c2c) communication. Such c2c communication can be secured using public key cryptography. For the two clouds systems to communicate, the tenants have to be created first on both of the clouds systems. One cloud system can be considered a core or service cloud system while the other cloud system can be considered a target or audience cloud system. A tenant on the service cloud trusts the tenant on the target cloud system. Both tenants have their tenant public keys exposed to one another. The private keys for each cloud's tenants are stored securely and not exposed to each other. Communication between the tenants in the two cloud systems can be established by minting a security token signed by the service cloud system tenant's private key and the target cloud system tenant can verifying this security token using the public key of the service cloud system tenant. Verification of the security token can then be utilized to establish the secure communication.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations for cloud to cloud (C2C) based provisioning and authentication for applications with a service cloud system footprint. Features of the target cloud system can be built with C2C authentication (i.e., support for asymmetric encryption between the target cloud system and the service cloud system). Therefore, it is beneficial for administrators of the service and target cloud systems to be able to monitor the C2C workflow to determine target cloud system service and function reliability and availability as well as to get alerted when failure of any of the services or functions occurs to limit the impact to the tenants of both the service cloud system and the target cloud system.

Since the private keys of the tenants and applications of the service cloud system cannot be exposed publicly, there is no way to directly monitor the communication between the applications of the service cloud system with the applications of the target cloud system (e.g., there is no way to mint security tokens utilized for c2c authentication). This security constraint limits the ability of administrators and developers to validate functionality of the services of the target cloud system in operation and introduces a major gap in monitoring tenant facing services.

This gap in monitoring the target cloud services produces a risk for the operations of both the service cloud system and the target cloud system. The embodiments overcome these issues by creating a test cloud system set up that acts as a proxy cloud for the service cloud system and allows tenants to be provisioned at the test cloud system successfully for purposes of testing and monitoring the target cloud system. The embodiments also provide a test framework that automates the steps necessary to successfully provision, establish trust, and authenticate into the services being monitored.

In some example embodiments, the test cloud system is an Einstein Test Cloud, by Salesforce, and the target cloud system is an Einstein cloud system, also by Salesforce. These cloud systems are used for purpose of illustration. The target cloud system can be any cloud system offering any array of functions and services. A complementary test cloud system would then be utilized to monitor and validate the selected target cloud system. The examples also use a Salesforce core cloud system as an example service cloud. As with the test cloud system, and target cloud systems, the service cloud system can be any type of cloud system that interacts with the target cloud system using C2C authenticated communication.

Figure 1:
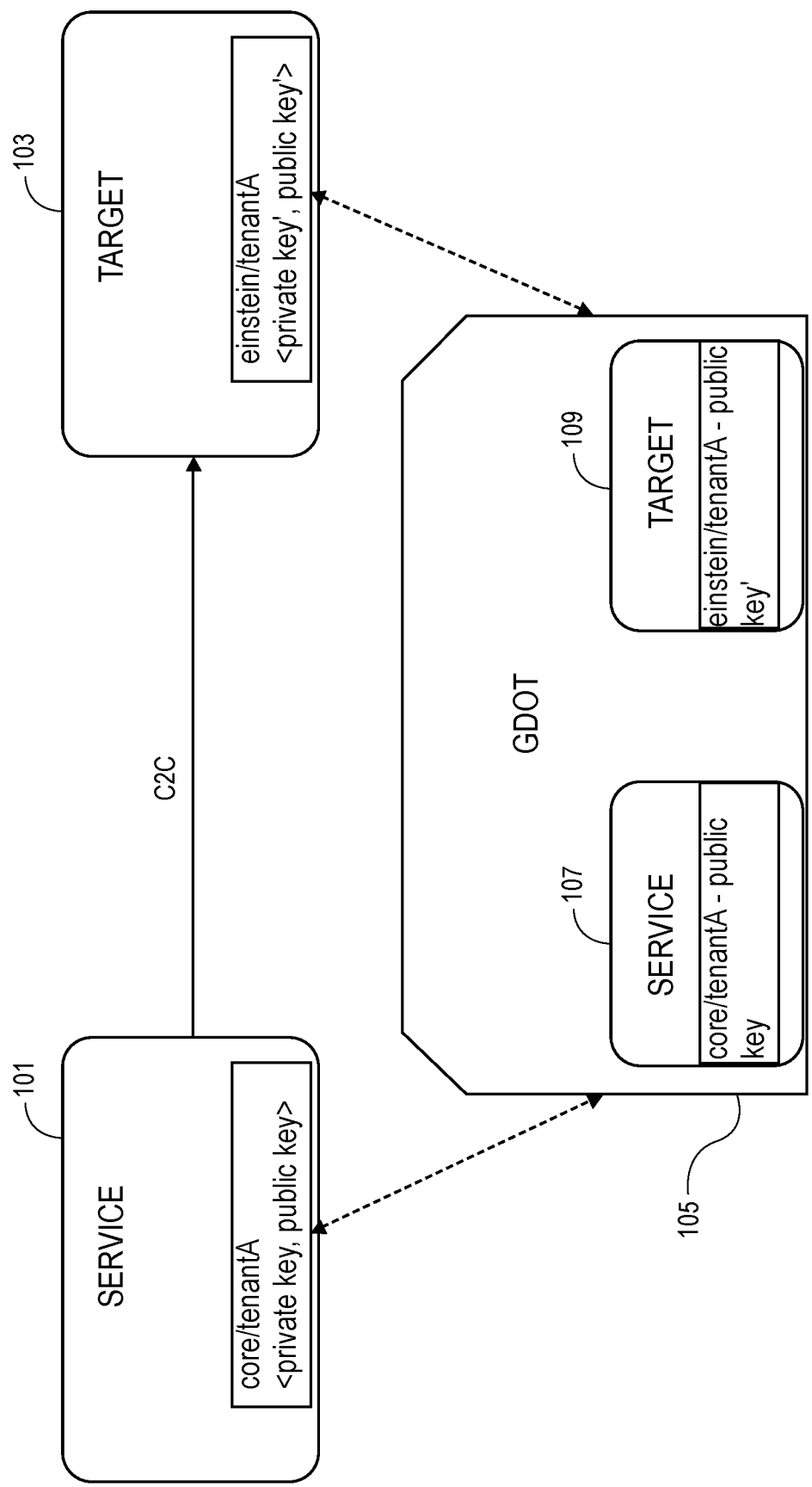
FIG. 1 is a diagram of one example embodiment of a service cloud system interacting with a target cloud system and a global directory of tenants (GDOT).

FIG. 1 is a diagram of one embodiment of C2C communication between a service cloud and a target cloud. In this example, a service cloud system 101 communicates with a target cloud system 103. This communication is an authenticated C2C communication channel. The C2C communication channel can use any communication protocols or technologies that involve a secure encrypted communication. Each of the cloud systems 101, 103 can be multi-tenant systems. The C2C communication channel can be more specifically between two applications of two tenants of the respective cloud systems 101, 103. The tenants of each cloud system 101, 103 can be the same real-world entity or different real-world entities (e.g., organizations such as companies with accounts/tenancy with the respective cloud systems 101, 103). The cloud systems 101, 103 can be managed by the same entity or different entities.

Each of the cloud systems 101, 103 can be in communication with a global directory of tenants (GDOT) 105 or similar application. The GDOT 105 can be hosted by any entity that is in communication with the cloud systems 101, 103. The GDOT stores public keys for tenants of each of the cloud systems 101, 103. In some embodiments, the GDOT can generate the public and private keys and otherwise participate in the provisioning of the tenants for each of the cloud systems 101, 103.

In the example the service cloud system 101 includes a tenant A that has a set of private and public keys. A 'set,' as used herein refers to any positive whole number of items, including one item. A copy of these keys is stored at the service cloud system 101. A copy of the public key is also stored at the GDOT 105 as a record 107 for the service cloud system. Similarly, the same tenant A has a public and private key stored at the target cloud system 103. These keys are separately provisioned, and the private keys are not shared. A copy of the public key for the tenant A of the target cloud system 103 is stored as a record 109 at the GDOT. In the process of establishing the C2C authenticated communication channel these public keys can be accessed from the GDOT to establish the communication channel using any asymmetric encrypt scheme.

Figure 2:
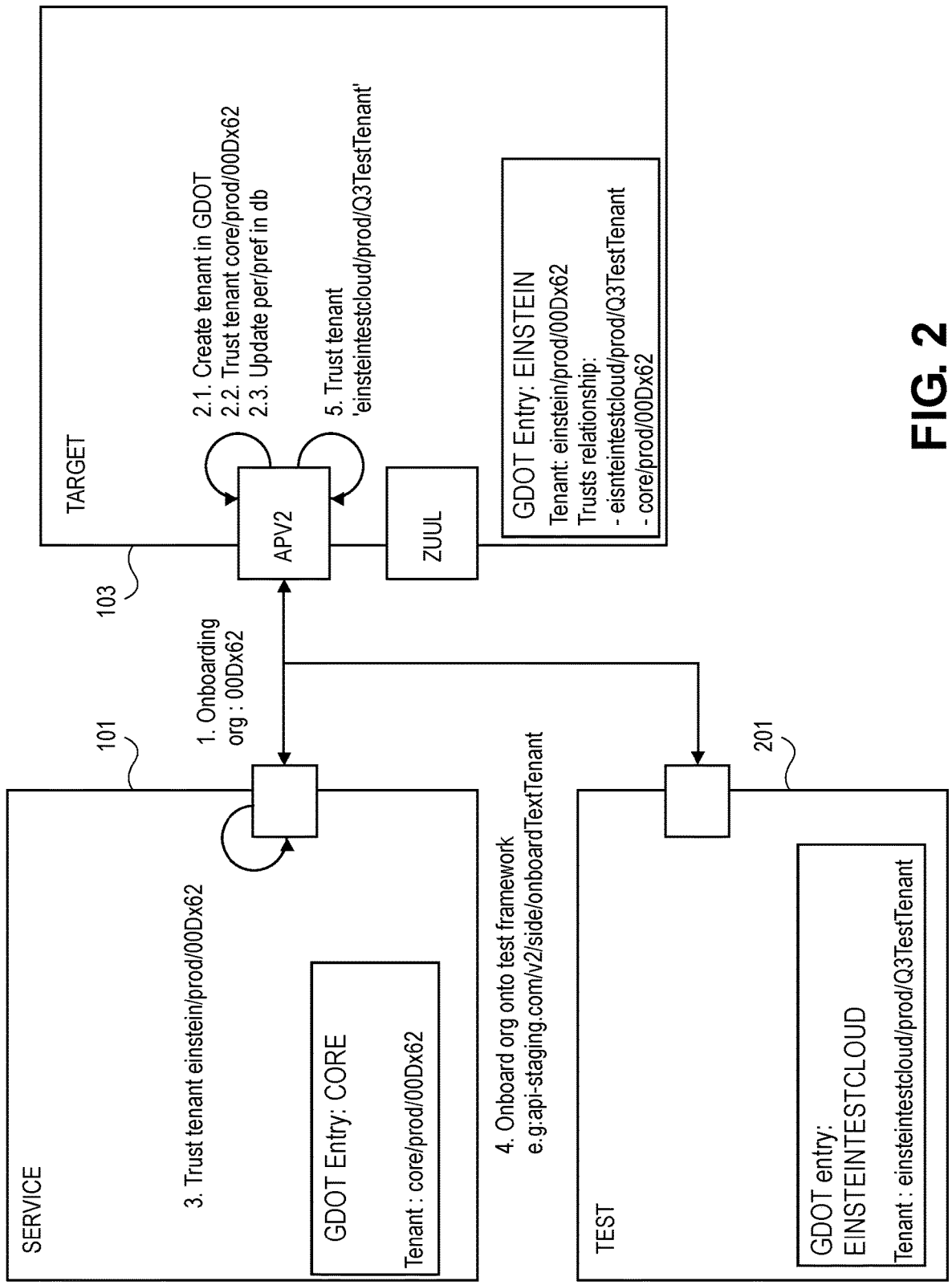
FIG. 2 is a diagram of one example embodiment of a test cloud system interacting with the target cloud system and the service cloud system.

FIG. 2 is a diagram of one embodiment of one embodiment of a test cloud system in communication with the target cloud system. In this example, a service cloud system 101 has a C2C authenticated communication channel with the target cloud system 103. A test cloud system 201 also has a C2C authenticated communication channel with the target cloud system 103. In this embodiment, the test cloud system 201 serves as a proxy for the service cloud system 101. The test cloud system 201 can access the functions and services of the target cloud system using a C2C authenticated communication channel to monitor and validate the functions of the target cloud system 103.

This configuration can be established as enumerated in the example illustration. The process can be initiated by the service cloud 101 establishing a connection (e.g., 'onboarding' (1)) with the target cloud system 103. A tenant is already established on the service cloud 101. The tenant has a correlated GDOT entry identifying the tenant at the service cloud 101 and providing a private/public key pair. The provisioning of the tenant at the service cloud 101 can be manual or automated process.

An application or user of the tenant of the service cloud system 101 can initiate the connection (e.g., onboarding) by making a call to target cloud system 103 (e.g., an Einstein system by Salesforce) to provision the tenant at the target cloud system 103. This call can be part of an application programming interface (API) of the target cloud system 103 (e.g., automated provisioning (APV2)). The call can initiate the creation of the tenant at the target cloud system 103 as well as create entries in the GDOT (not shown). The GDOT entry can record a trust relationship with the tenant of the service cloud 101 (e.g., prod90Dx62). Public and private keys can be distributed to the target cloud system for the tenant. A confirmation of the completion of the process can be returned to the service cloud 101. The service cloud system 101 also has a GDOT entry and generates public and private keys. The GDOT entry for the tenant at the service cloud system 101 can indicate a trust relationship with the target cloud system 103. The public keys of the service cloud system 101 and the target cloud system 103 can be utilized to establish a C2C authenticated communication channel using any asymmetric encryption protocol or system.

The test cloud system 201 can monitor and verify the operation of the tenant at the target cloud system by provisioning the tenant at the test cloud system 201 and establishing another C2C authenticated communication channel with the tenant at the target cloud system 103. This second C2C authenticated communication channel can be established by provisioning the tenant on the test cloud system (e.g., an EinsteinTestCloud by Salesforce) and creating GDOT entries for the tenant (e.g., prodQ3TestTenant). The creation of the GDOT entries can include generating and distributing public and private keys to the test cloud system 201 for the tenant where the tenant can securely store the private key at the test cloud system 201. A trust relationship between the test cloud system 201 tenant and the target cloud system 103 is established and recorded in the GDOT entries for each tenant.

The trusting of the test cloud system 201 tenant creates a whitelisting of that tenant at the target cloud system 103 that enables the establishment of the second C2C authenticated communication channel and thereby the monitoring and verification. In some embodiments, the test cloud system 103 generates a security token (e.g., a JavaScript Object Notation (JSON) web token (Jwt) token) using the private keys of the test cloud system 201 tenant. A monitor service at the test cloud system 103 can make a call to establish the C2C authenticated connection with the target cloud system 103.

The test cloud system 201 is a parallel or proxy setup to mimic the operation of any service cloud 101. In this example, the service cloud 101 can be a Salesforce CORE cloud system and the test cloud system can be a Salesforce EinsteinTestCloud whereas the target cloud is a Salesforce EINSTEIN cloud system. Authentication between test cloud system and the target cloud system mimics the service cloud's first C2C communication channel configuration for establishing the second C2C communication channel and trust relationship.

The embodiments can involve creating a special partner API that is guarded by a security token or similar mechanism to establish a trust relationship with the target cloud system 103. The embodiments provide an improvement where the trust relationship between tenants can be extended across clouds while adhering to strict security protocols and access controls. The partner API is secured where each cloud system/environment has a unique security token, the generation of the security token is controlled with specialized restricted access, whitelisting of tenants (i.e., organizations) prevents misuse even if the access token is compromised. Whitelisting itself is also subjected to a different set of access restrictions.

As mentioned above, the test cloud system 201 is setup to act as a proxy for the service cloud system 101. The test cloud system 201 (e.g., an EinsteinTestCloud) in configured by identifying a tenant and/or organization for which testing is to be performed against the target cloud system. The same or related tenant and/or organization is provisioned or onboarded or previously established at the target cloud system as well as the service cloud system.

Figure 3:
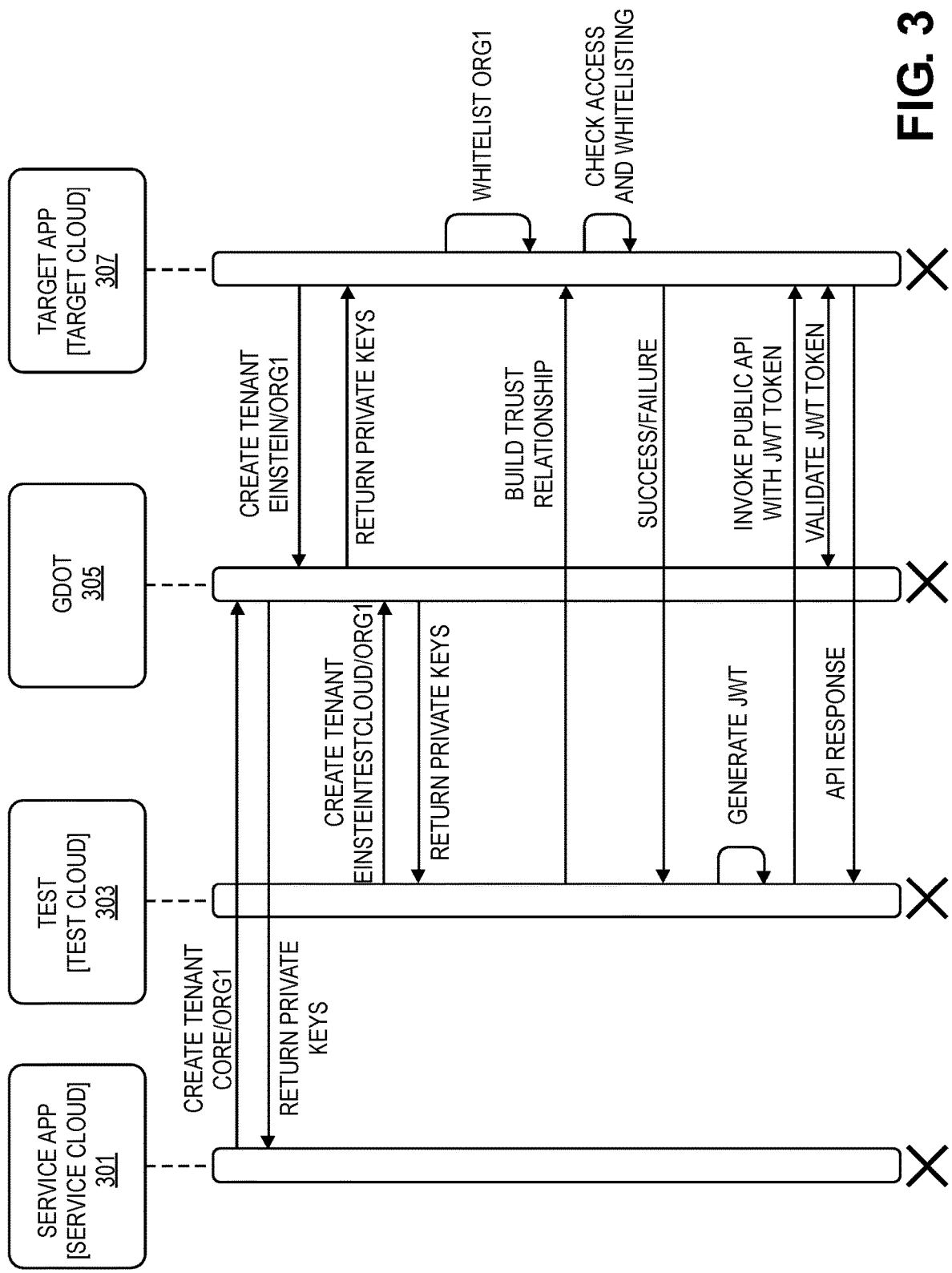
FIG. 3 is a timing diagram of one embodiment of the interactions between a source application, test application, GDOT, and target application.

FIG. 3 is a timing diagram of one embodiment of the interactions between the components of the C2C modeling and verification process. As previously described, the process can be initiated by an application (e.g., a service application 301) at the service cloud that initiates the creation of a tenant and/or org at the service cloud that is registered at the GDOT 305 via a create tenant call or similar call to the API of the GDOT that specifies the tenant and/or organization to be recorded. In this example embodiment, the GDOT generates and returns at least one private key for the service application 301. The GDOT stores a corresponding public key for the newly created tenant and/or organization. In some embodiments, the private/public keys are both returned to the service application 301. Public/private keys can be generated per application, tenant, organization, user, or similar entity.

Similarly, a target application 307 at the target cloud system a correlated tenant and/or organization is provisioned and a create tenant request sent to the GDOT 305. The GDOT 305 returns a set of private keys to the target application 307. The set of keys includes at least one private key. The private keys can be generated per application, tenant, organization, user or similar entity. In some embodiments the public keys that complement the set of private keys can also be returned to the target application 307. In other embodiments, the public keys are stored solely at the GDOT 305. The creation of the tenants at the target cloud system and the service cloud system can be in parallel or in any order.

The test application 303 is similarly provisioned at the test cloud system. The process creates a correlated tenant or organization at the test cloud system. The tenant or organization executes the test applications, which requests to create the tenant by calling the GDOT 305. The GDOT 305 returns a set of private keys to the test application 303. The set of keys includes at least one private key. The private keys can be generated per application, tenant, organization, user or similar entity. In some embodiments the public keys that complement the set of private keys can also be returned to the test application 303. In other embodiments, the public keys are stored solely at the GDOT 305. The creation of the tenants at the test cloud system, target cloud system, and the service cloud system can be in parallel or in any order. The tenant and test application 303 at the test cloud are configured to mirror or provide a proxy for the operation of the service application 301 and service cloud system.

The process establishes trust from the target application 307 to the service application 301. The tenant at the target application can add the test application tenant (and service application tenant) to a whitelist that controls the APIs of the target application. The test application makes a call to setup a C2C authenticated communication channel with the API of the target application 307 using a unique security token generated from the public key of the target application 307 and a private key of the test application. The target application 307 will verify and establish trust with the test application and tenant, checking the whitelisting of the tenant/organization/application and returning a success or failure indicator to the test application 303.

Once the trust relationship is established, then the test application 303 can generate a security token (e.g., a Jwt) using the public key of the target application 307 and the private key of the test cloud. With the security token the APIs of the target application 307 can be called and the security token provided. If the security token is validated, then the API can provide an appropriate response. In this manner, the test application 303 can access the API of the target application 307 in the same manner as the service application 301. Each function of the API can be called to monitor the responsiveness and validate the operation of each function. The monitored information about the operation of the target application 307 can be collected and reported for any entity without compromising the security of the service application 301.

Figure 4:
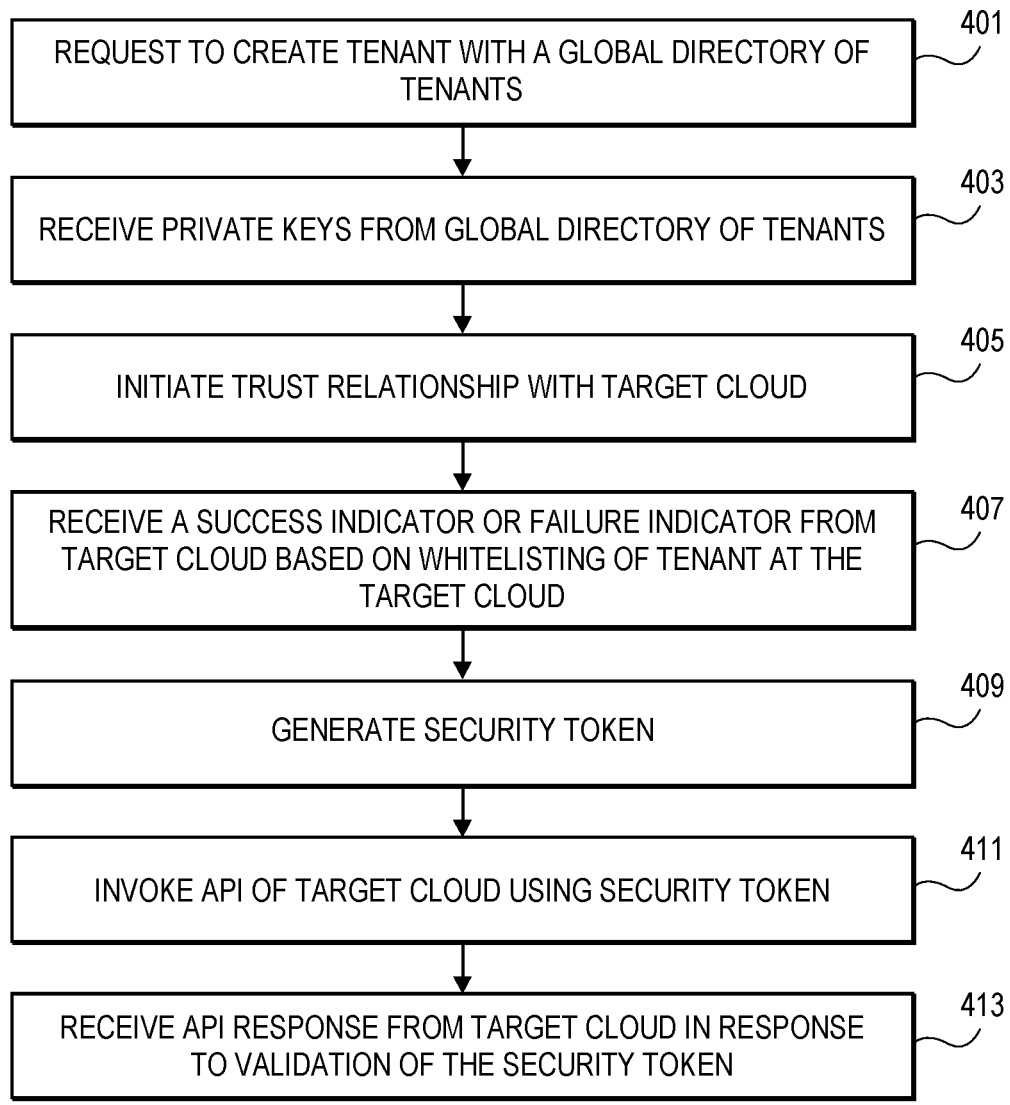
FIG. 4 is a flowchart of one embodiment of the process of the test cloud system to support authentication and monitoring of the target cloud system.

FIG. 4 is a flowchart of one embodiment of the operation of the test application of the test cloud system. As discussed above, the test application and test cloud system can be provisioned for a given tenant that has correlated tenants provisioned in the service cloud and the target cloud systems. The test application can request to create a tenant with the GDOT (Block 401). In response, the test application receives private keys from the GDOT (Block 403). In some embodiments, public keys can also be returned. The target application initiates trust relationship with target cloud (Block 405). This trust relationship can involve generation of a unique access token that is controlled by specialized restricted access. The test cloud is added to a whitelist at the target application and target cloud.

The test application receives a success indicator or failure indicator from target cloud based on whitelisting of tenant at the target cloud (Block 407). Once the trust relationship is confirmed, then the test application can access the functionality of the target application by making function calls on the APIs of the test application. The test application can generate a security token (e.g., a Jwt) (Block 409). The test application can invoke any API of the target application on the target cloud system using the security token (Block 411). The target application receives an API response from target application of the target cloud in response to validation of the security token (Block 413). Any number and frequency of API calls can be made to any variety of the API functions to validate and monitor the operation of the target application and the target cloud system.

Figure 5:
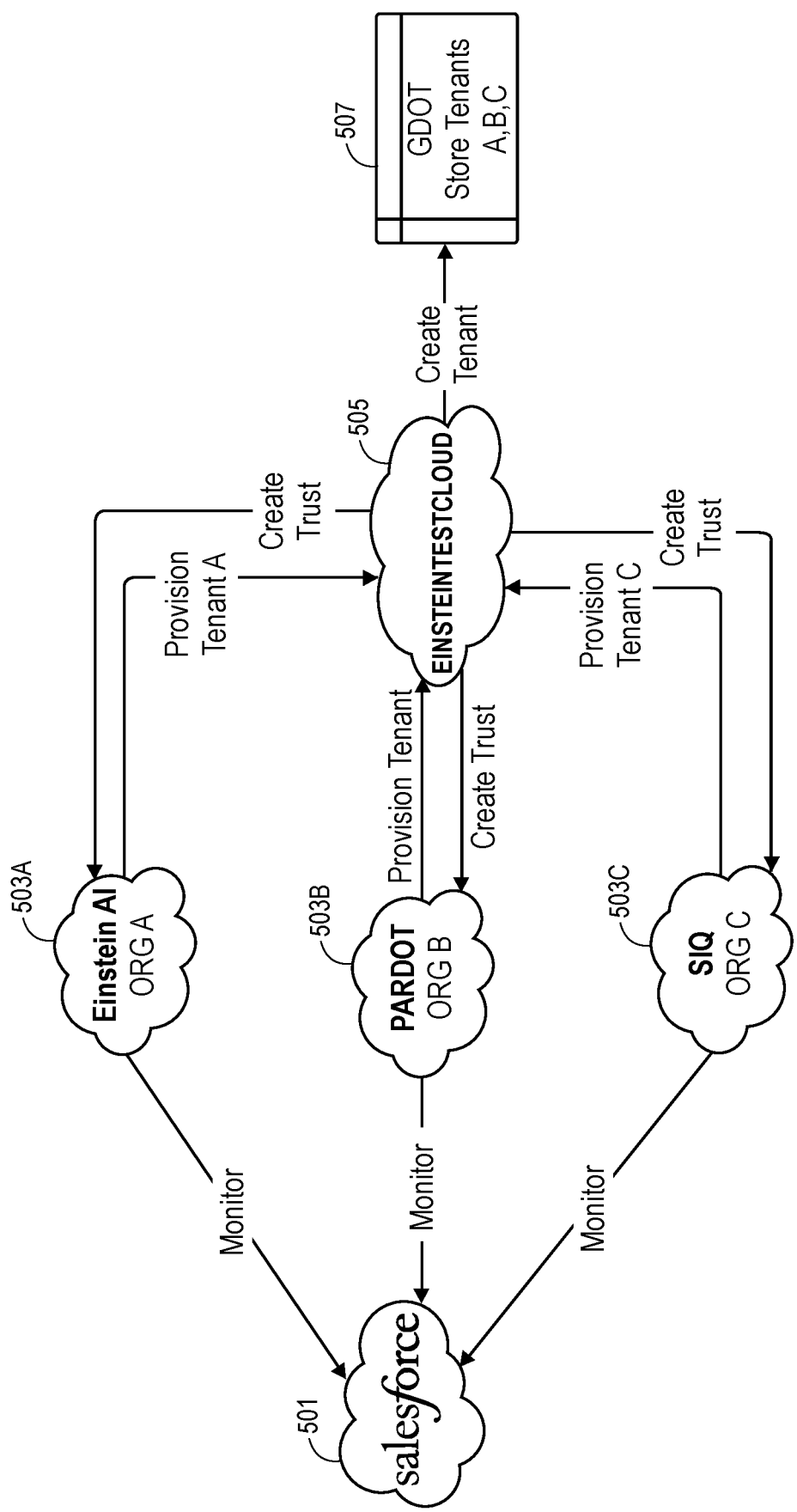
FIG. 5 is a diagram of one example embodiment of a test cloud system servicing multiple target cloud systems.

FIG. 5 is a diagram of one example embodiment of a test cloud system supporting multiple target cloud systems. In the example embodiment, a set of target cloud systems 503A-C have C2C authenticated communication channels with a service cloud system 501. Each of the target cloud systems 503A-C can have separate tenants or organizations that have correlated tenants and organizations at both the service cloud system 501 and the test cloud system 505.

The test cloud system 505 can host each of these tenants and provide monitoring and verification for each target application and cloud system 503A-C. Each target application and cloud system 503A-C can be monitored and validated by separate test applications of separately provisioned tenants that correlate with the target applications. The GDOT 507 can store the public keys of each of the tenants (e.g., tenants A, B, and C).

As with the prior examples, each test application and tenant can be provisioned and each target application, tenant, and cloud system 503A-C can be provision and trust established in the same manner as where a single target application and cloud system is present. Each target application stores its respective private keys, and a whitelist that approves specific tenants and organizations that are to be trusted. The private keys generated for each tenant or target application can be stored securely in a vault, which is a tool used for securely storing secrets. Whitelist approved tenants and organizations can be recorded in respective records at the GDOT and at each test and target application. Using the trust system prevents rogue organizations from being on boarded.

The trust relationship checks if the tenant or organization is present in an approved whitelist first, prior to enabling trust between the test application cloud system and the target application and cloud system. Integration with multiple target clouds is supported such that the test cloud acts as a proxy to the service cloud allowing other target clouds that exist separate from the service cloud to securely provision their tenants and mint security tokens (e.g., Jwt tokens) for monitoring the health and validity of their services and functions, without violating the trust of the service cloud system 501.

The embodiments provide various benefits including monitoring that allows the test cloud to facilitate the monitoring of public facing services (APIs) using C2C authentication without compromising the service cloud or test cloud private keys. Further benefits include establishing trust securely between cloud systems as a public entity, scalability where the embodiments can integrate multiple clouds to the test cloud system, self-service that integrates with the internal applications services of the target applications. A self-service application that allows target cloud system service owners to make tenant provisioning requests using this setup. The embodiments provide security and as a core value along with minimizing services disruptions and impacts to tenants of the target cloud system and service cloud system.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6A:
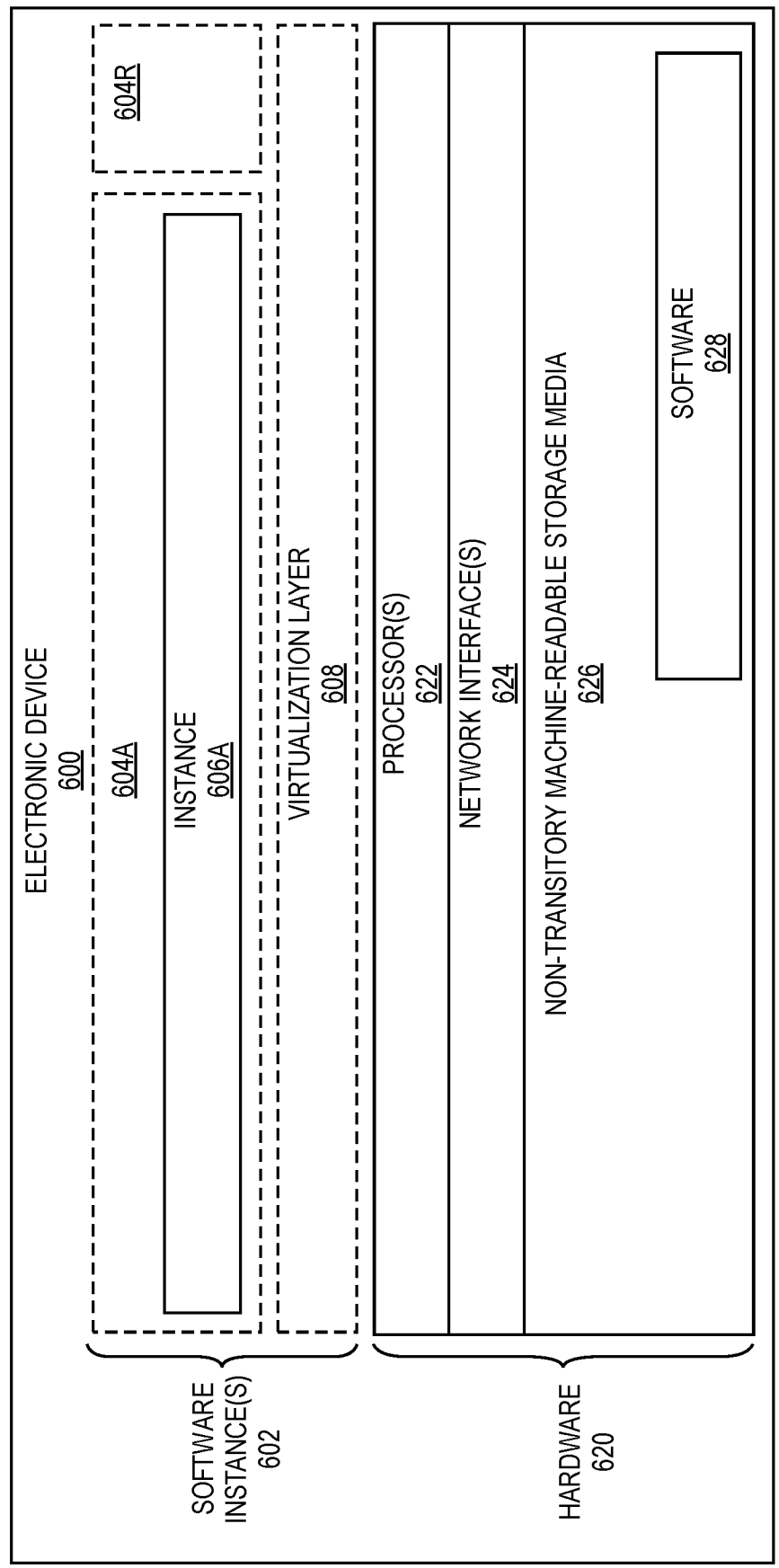
FIG. 6A is a block diagram illustrating an electronic device according to some example implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and machine-readable media 626 having stored therein software 628 (which includes instructions executable by the set of one or more processor(s) 622). The machine-readable media 626 may include non-transitory and/or transitory machine-readable media. Each of the previously described clients and the test cloud service may be implemented in one or more electronic devices 600. In one implementation: 1) each of the clients is implemented in a separate one of the electronic devices 600 (e.g., in end user devices where the software 628 represents the software to implement clients to interface directly and/or indirectly with the TEST CLOUD service (e.g., software 628 represents a web browser, a native client, a portal, a command-line interface, and/or an application programming interface (API) based upon protocols such as Simple Object Access Protocol (SOAP), Representational State Transfer (REST), etc.)); 2) the test cloud service is implemented in a separate set of one or more of the electronic devices 600 (e.g., a set of one or more server devices where the software 628 represents the software to implement the test cloud service); and 3) in operation, the electronic devices implementing the clients and the test cloud service would be communicatively coupled (e.g., by a network) and would establish between them (or through one or more other layers and/or or other services) connections for submitting requests to the test cloud service and returning monitoring and validation to the clients. Other configurations of electronic devices may be used in other implementations (e.g., an implementation in which the client and the test cloud service are implemented on a single one of electronic device 600).

During operation, an instance of the software 628 (illustrated as instance 606 and referred to as a software instance; and in the more specific case of an application, as an application instance) is executed. In electronic devices that use compute virtualization, the set of one or more processor (s) 622 typically execute software to instantiate a virtualization layer 608 and one or more software container(s) 604A-604R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers 604A-604R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-604R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 628 is executed within the software container 604A on the virtualization layer 608. In electronic devices where compute virtualization is not used, the instance 606 on top of a host operating system is executed on the "bare metal" electronic device 600. The instantiation of the instance 606, as well as the virtualization layer 608 and software containers 604A-604R if implemented, are collectively referred to as software instance(s) 602.

Alternative implementations of an electronic device may have numerous variations from that described above. For example, customized hardware and/or accelerators might also be used in an electronic device.

Example Environment

Figure 6B:
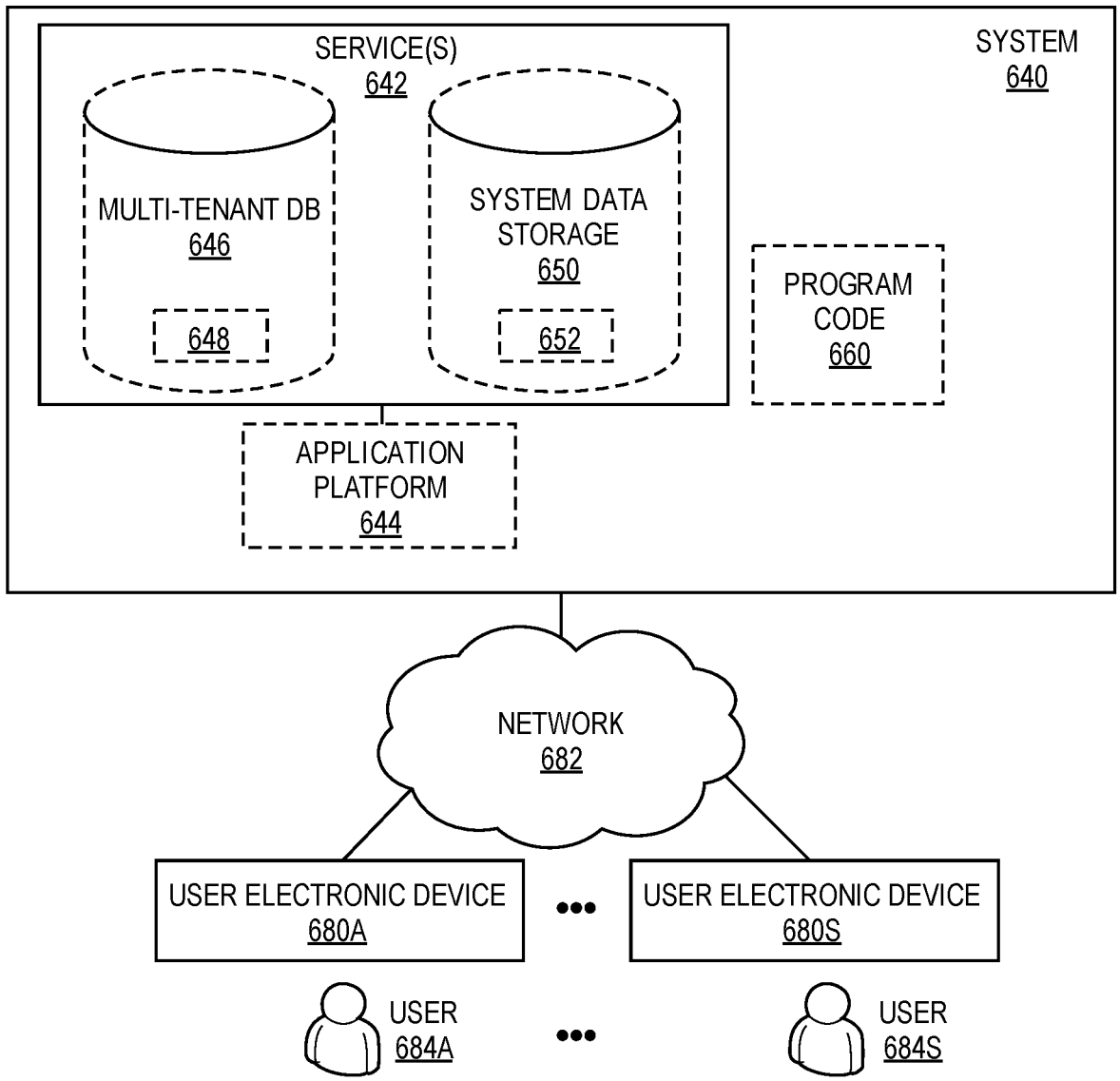
FIG. 6B is a block diagram of a deployment environment according to some example implementations.

FIG. 6B is a block diagram of a deployment environment according to some example implementations. A system 640 includes hardware (e.g., a set of one or more server devices) and software to provide service(s) 642, including the test cloud service. In some implementations the system 640 is in one or more datacenter(s). These datacenter(s) may be: 1) first party datacenter(s), which are datacenter(s) owned and/or operated by the same entity that provides and/or operates some or all of the software that provides the service(s) 642; and/or 2) third-party datacenter(s), which are datacenter(s) owned and/or operated by one or more different entities than the entity that provides the service(s) 642 (e.g., the different entities may host some or all of the software provided and/or operated by the entity that provides the service(s) 642). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 640 is coupled to user devices 680A-680S over a network 682. The service(s) 642 may be on-demand services that are made available to one or more of the users 684A-684S working for one or more entities other than the entity which owns and/or operates the on-demand services (those users sometimes referred to as outside users) so that those entities need not be concerned with building and/or maintaining a system, but instead may make use of the service(s) 642 when needed (e.g., when needed by the users 684A-684S). The service(s) 642 may communicate with each other and/or with one or more of the user devices 680A-680S via one or more APIs (e.g., a REST API). In some implementations, the user devices 680A-680S are operated by users 684A-684S, and each may be operated as a client device and/or a server device. In some implementations, one or more of the user devices 680A-680S are separate ones of the electronic device 600 or include one or more features of the electronic device 600.

In some implementations, the system 640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 640 is a multi-tenant cloud computing architecture supporting multiple services, such as one or more of the following types of services: testing and analytics, Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 640 may include an application platform 644 that enables PAAS for creating, managing, and executing one or more applications developed by the provider of the application platform 644, users accessing the system 640 via one or more of user devices 680A-680S, or third-party application developers accessing the system 640 via one or more of user devices 680A-680S.

In some implementations, one or more of the service(s) 642 may use one or more multi-tenant databases 646, as well as system data storage 650 for system data 652 accessible to system 640. In certain implementations, the system 640 includes a set of one or more servers that are running on server electronic devices and that are configured to handle requests for any authorized user associated with any tenant (there is no server affinity for a user and/or tenant to a specific server). The user devices 680A-680S communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the multi-tenant database(s) 646 and/or system data storage 650.

In some implementations, the service(s) 642 are implemented using virtual applications dynamically created at run time responsive to queries from the user devices 680A-680S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications, including the test cloud service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 640 and the user devices 680A-680S.

Each user device 680A-680S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow one or more of users 684A-684S to interact with various GUI pages that may be presented to the one or more of users 684A-684S. User devices 680A-680S might communicate with system 640 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 680A-680S might include an HTTP client, commonly referred to as a "browser," for sending and receiving HTTP messages to and from server(s) of system 640, thus allowing users 684A-684S of the user devices 680A-680S to access, process and view information, pages and applications available to it from system 640 over network 682.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method for monitoring cloud to cloud performance using a test cloud system, the method comprising:
   initiating a first trust relationship by the test cloud system with a first target cloud system;
   receiving a success indicator for the first trust relationship, in response to the first target cloud system verifying the test cloud system is whitelisted;
   generating a security token using a private key of the test cloud system; and
   invoking a function of an application programming interface of the first target cloud system using the security token to validate functionality of the function of the application programming interface of the first target cloud system.

2. The method of claim 1, wherein the first trust relationship is between a tenant of the test cloud system and the tenant on the first target cloud system.

3. The method of claim 1, further comprising:
   requesting to create a tenant with a global directory of tenants; and
   receiving a private key from the global directory of tenants.

4. The method of claim 1, further comprising:
   receiving a response to the function of the application programming interface of the first target cloud system, in response to validation of the security token.

5. The method of claim 1, further comprising:
   initiating a second trust relationship by the test cloud system with a second target cloud system; and
   receiving a success indicator for the second trust relationship, in response to the second target cloud system verifying the test cloud system is whitelisted.

6. The method of claim 5, further comprising:
   invoking a function of an application programming interface of the second target cloud system using the security token to validate functionality of the function of the application programming interface of the second target cloud system.

7. The method of claim 1, wherein a response to the invocation of the function of the application programming interface of the first target cloud system is monitored to detect the operation of the first target cloud system.

8. A non-transitory machine-readable storage medium that provides instructions that, if executed by a set of one or more processors, are configurable to cause the set of one or more processors to perform operations of a method for monitoring cloud to cloud performance using a test cloud system, the operations comprising:

initiating a first trust relationship by the test cloud system with a first target cloud system;

receiving a success indicator for the first trust relationship, in response to the first target cloud system verifying the test cloud system is whitelisted;

generating a security token using a private key of the test cloud system; and invoking a function of an application programming interface of the first target cloud system using the security token to validate functionality of the function of the application programming interface of the first target cloud system.

9. The non-transitory machine-readable storage medium of claim 8, wherein the first trust relationship is between a tenant of the test cloud system and the tenant on the first target cloud system.

10. The non-transitory machine-readable storage medium of claim 8, wherein the operations further comprising:

requesting to create a tenant with a global directory of tenants; and receiving a private key from the global directory of tenants.

11. The non-transitory machine-readable storage medium of claim 8, wherein the operations further comprising:

receiving a response to the function of the application programming interface of the first target cloud system, in response to validation of the security token.

12. The non-transitory machine-readable storage medium of claim 8, wherein the operations further comprising:

initiating a second trust relationship by the test cloud system with a second target cloud system; and receiving a success indicator for the second trust relationship, in response to the second target cloud system verifying the test cloud system is whitelisted.

13. The non-transitory machine-readable storage medium of claim 12, wherein the operations further comprising:

invoking a function of an application programming interface of the second target cloud system using the security token to validate functionality of the function of the application programming interface of the second target cloud system.

14. The non-transitory machine-readable storage medium of claim 8, wherein a response to the invocation of the function of the application programming interface of the first target cloud system is monitored to detect the operation of the first target cloud system.

15. An apparatus comprising:

a set of one or more processors; and a non-transitory machine-readable storage medium that provides instructions that, if executed by the set of one or more processors, are configurable to cause the apparatus to perform operations of a method for monitoring cloud to cloud performance using a test cloud system, the operations to initiate a first trust relationship by the test cloud system with a first target cloud system, receive a success indicator for the first trust relationship, in response to the first target cloud system verifying the test cloud system is whitelisted, generate a security token using a private key of the test cloud system, and invoke a function of an application programming interface of the first target cloud system using the security token to validate functionality of the function of the application programming interface of the first target cloud system.

16. The apparatus of claim 15, wherein the first trust relationship is between a tenant of the test cloud system and the tenant on the first target cloud system.

17. The apparatus of claim 15, wherein the operations further include to request to create a tenant with a global directory of tenants, and to receive a private key from the global directory of tenants.

18. The apparatus of claim 15, wherein the operations further include to receive a response to the function of the application programming interface of the first target cloud system, in response to validation of the security token.

19. The apparatus of claim 15, wherein the operations further include to initiate a second trust relationship by the test cloud system with a second target cloud system, and to receive a success indicator for the second trust relationship, in response to the second target cloud system verifying the test cloud system is whitelisted.

20. The apparatus of claim 19, wherein the operations further include to invoke a function of an application programming interface of the second target cloud system using the security token to validate functionality of the function of the application programming interface of the second target cloud system.

21. The apparatus of claim 15, wherein a response to the invocation of the function of the application programming interface of the first target cloud system is monitored to detect the operation of the first target cloud system.

\* \* \* \* \*